United States Patent [19]

Simon

[11] 3,997,388

[45] Dec. 14, 1976

[54] DEHYDRATION OF MANURE

[76] Inventor: Victor Simon, 26, rue Vasco de Gama, 75015 Paris, France

[22] Filed: Mar. 25, 1974

[21] Appl. No.: 454,642

[30] Foreign Application Priority Data

| | | |
|---|---|---|
| Apr. 2, 1973 | France | 73.11814 |
| Nov. 26, 1973 | France | 73.42027 |
| Mar. 1, 1974 | France | 74.07178 |

[52] U.S. Cl. .......................... 159/47 R; 159/1 RW; 159/1 A; 159/DIG. 26; 159/49; 34/4

[51] Int. Cl.[2] .......................................... B01D 1/00

[58] Field of Search ............. 34/1, 4; 426/237, 238; 159/2 E, 47 R, DIG. 10, DIG. 26, 1 A, 1 RW, 49

[56] References Cited

UNITED STATES PATENTS

| | | | |
|---|---|---|---|
| 2,533,125 | 12/1950 | Levinson et al. | 159/DIG. 26 |
| 2,546,004 | 3/1951 | Kinn | 34/1 X |
| 2,579,944 | 12/1951 | Marshall | 159/DIG. 26 |
| 2,953,457 | 9/1960 | Sanna | 159/DIG. 26 |
| 3,093,460 | 6/1963 | Dietert | 34/1 |
| 3,175,299 | 3/1965 | Boucher | 159/1 A |
| 3,409,447 | 11/1968 | Jeppson | 159/DIG. 26 |
| 3,523,076 | 8/1970 | Goerz, Jr. et al. | 159/DIG. 26 |
| 3,528,179 | 9/1970 | Smith | 159/DIG. 26 |
| 3,550,524 | 12/1970 | Brumagim | 99/470 |
| 3,751,267 | 8/1973 | Sachnik | 426/520 |
| 3,775,860 | 12/1973 | Barnes et al. | 34/1 |
| 3,785,384 | 1/1974 | Sylvester et al. | 34/1 |
| 3,831,288 | 8/1974 | Stribling et al. | 34/1 |

*Primary Examiner*—Jack Sofer
*Attorney, Agent, or Firm*—William Anthony Drucker

[57] ABSTRACT

A method and apparatus for the dehydration of cattle and horse manure, cow dung or pig droppings, characterized by the action of a flow of hot air and of ultrasonic radiation along the path of the matter to be dehydrated, and that of microwave radiation at a preferred frequency of 2450 MHz which produces internal heating, these actions taking place separately or in conjunction. Manure from which gas has previously been removed by aspiration at temperature lower than that of self-ignition, is utilized. Combustible gases are recovered and used preferably to the heating of the air.

Two types of apparatus are envisaged, one incorporating a conveyor belt and the other a helical worm provided with a plurality of perforations for the hot air to pass through. The ultrasonic radiation accelerates evaporation and discourages matter from adhering to the surfaces.

2 Claims, 3 Drawing Figures

FLOW DIAGRAM

DEHYDRATION OF MANURE

The present invention relates to methods of and apparatus for dehydrating cattle or horse manure, and pig and horse droppings, hereinafter referred to as animal ordure.

Factory farming methods which are becoming more and more widely accepted, call for installations containing large numbers of animals, possibly several hundreds, to be set up in close proximity to towns. When this is done, fresh problems arise relating to the removal and recovery of the animal ordure.

At the present time, using known methods, the ordure is fed along in contact with a flow of hot air. However, evaporation is relatively slow on the one hand and on the other a very large amount of hot air is used.

An object of the invention is to accelerate the dehydration of such ordure and at the same time to economise on the amount of hot air consumed.

The invention consists in a method of dehydrating animal ordure wherein the ordure is caused to move along a path and subjected to the simultaneous action of a hot air flow, and of ultrasonic and/or microwave radiation during such movement.

The invention also consists in apparatus for dehydrating animal ordure comprising means for causing the ordure to move along a path and means for subjecting said ordure to a flow of hot air and to ultrasonic and/or microwave radiation during such movement.

It is known that microwave radiation produced by magnetrons or other generators, which preferably operate at a frequency of 2,450 MHz (which has been universally adopted for industrial applications) makes it possible immediately to heat up the interior of articles irradiated, and thus cause a certain percentage of their internal moisture to disperse to the exterior where it can be removed by conventional means such as hot air scavenging.

In order that the invention may be more clearly understood, reference will now be made to the accompanying drawings, which schematically show two embodiments thereof by way of example, and in which.

Figure 1:
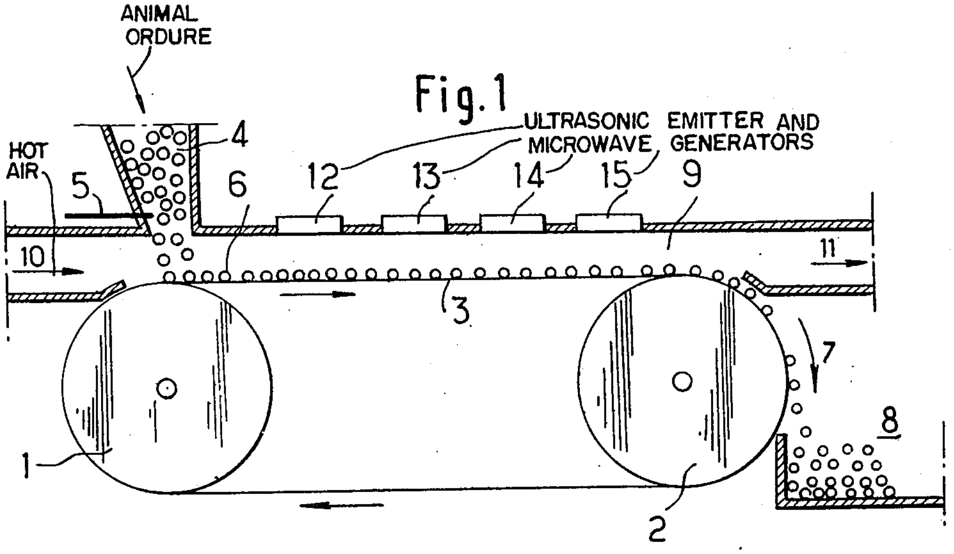
FIG. 1 shows a side-view of a first embodiment of dehydrating apparatus.

Referring now to the drawings, in FIG. 1, can be seen two pulleys 1 and 2 which drive a conveyor belt 3 which is made either of a flexible and continuous material, or else of identical members hinged together in known way after the fashion of a sprocket chain. A hopper 4 empties the ordure shown at 6 on to the belt, with a movable flap 5 allowing the rate of input to be adjusted to suit the speed selected from the belt. The ordure may be free of straw, or in the form of manure it may be mixed with straw. The incoming manure is in the "settled" state, a large part of the urine having already been drained off. It may be fed in as it is or may have been treated beforehand by being chopped, pressed or granulated and preferably partially dessicated by compression.

At 7 the dried ordure drops to a point 8 where it is removed and bagged in the form of pellets, granules or powder, using known means which per se form no part of the invention.

A duct 9 for hot air allows air to flow either in the direction shown by arrows 10 and 11, or preferably in the opposite direction to that in which the ordure to be dehydrated moves. In this second embodiment, the hotter air enters at 11 to complete the dehydration process, whereas with the first embodiment the very hot air at 10 quickly absorbs moisture and cools down, thus becoming less able to complete the process of desiccating the matter.

To the foregoing arrangements, the invention adds, in combination, a series of stations 12 to 15 which accelerate the process of evaporating the liquid of the ordure, some of these stations comprising ultrasonic emitters operating at suitable frequency, and others being microwave generators whose frequency is preferably 2450 MHz. It is of course possible, in a particular embodiment of the invention, for all the stations to be of one or other type. As a result of this the belt 6 may move more rapidly and/or may be shortened in length as compared with known apparatus.

Figure 2:
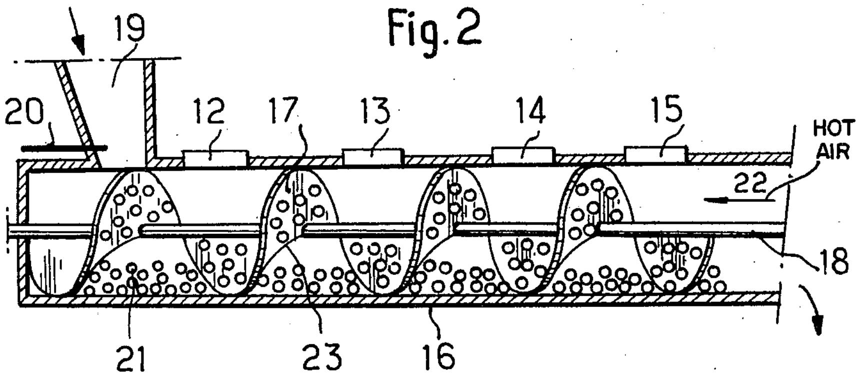
FIG. 2 shows a second embodiment of such apparatus.

FIG. 2 shows a modified embodiment in which the same method of dehydration is applied. A duct 16 encloses a worm 17 having a shaft 18. A hopper 19 equipped with a regulating flap 20 allows the in-feed of animal ordure to be dried, the ordure falling chiefly into the bottom part 21 of the duct. The helical surface of the worm 17 contains numerous perforations 23 which allow a flow of hot air to pass through them. The perforations in question are sufficiently small not to allow the ordure to pass through.

The ultrasonic emitters 12, 13, 14 and 15 perform a double function. On the one hand they accelerate evaporation and thus the dehydration of the manure and other matter. On the other, the ultrasonics generated discourage ordure from adhering either to the wall of duct 16 or to the surface of helical worm 17, thus preventing the perforations from becoming blocked (which would happen if there were no ultrasonic vibration) and entirely stopping the flow of hot air.

Alternatively, some or all of stations 12 to 15 may be microwave generators.

As was stated with regard to FIG. 1, the flow of hot air is preferably in the opposite direction (arrow 22) from the flow of ordure which is to be dried.

The invention may employ other means of circulating the ordure and the hot air, because in effect, the invention resides in essence in the co-operation between the action of the hot air (however produced) and the actions of the vibrations caused by the ultrasonic emitters and of the waves coming from the microwave generators, either separately or together.

In all cases means (not shown) are provided to regulate the energy coupling between the microwave generator and a wave guide used for guiding the waves generated, taking into account in the usual way the size of the delta tangent or loss angle and the mean dielectric constant of the ordure to be dried. Preferably means are used which regulate the energy emitted as a function of the absorptiveness of the ordure.

Furthermore, the ordure handled in the present apparatus will preferably have been treated in a known type of system (not shown) for producing the hydrocarbons known as "manure gas." The gas produced and recovered in this way is used, outside the apparatus proper, for heating the hot air for dehydration.

Figure 3:
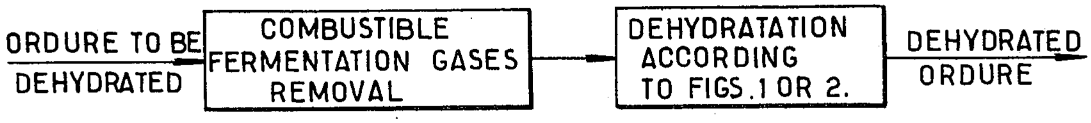
FIG. 3 is a flow diagram of an apparatus according to either FIGS. 1 or 2.

When the spontaneously inflammable gases are not collected in an apparatus preceding that shown in FIGS. 1 and 2, according to the flow diagram of FIG. 3 they are removed by means of a negative pressure created at the outlet of the apparatus, the temperature being maintained at a level below the flash point of the gases.

The suction in question may or may not be applied simultaneously with the application of the ultrasonic and/or microwave radiation, or before the conveyor belt 3 or worm 17 are put into operation.

By way of modification, two sets of apparatus of the type shown in either FIG. 1 or FIG. 2 may be used in series, the first employing suction and then supplying the degasified manure to the hopper of the second; the inflammable gases collected are then used to heat the air for dehydration in the second apparatus.

What I claim is:

1. A method of dehydrating animal ordure, wherein said ordure comprises combustible fermentation gases, the said method comprising the successive steps of removing the said gases from the animal ordure and of causing the ordure to move along a path, while subjecting the ordure to the simultaneous action of hot air flowing in the opposite direction to the movement of the ordure and of ultrasonic vibrations.

2. A method of dehydrating animal ordure, wherein said ordure comprises combustible fermentation gases, the said method comprising the successive steps of removing the said gases from the animal ordure and of causing the ordure to move along a path, while subjecting the ordure to the simultaneous action of hot air flowing in the opposite direction to the movement of the ordure and of ultrasonic vibrations and microwave radiations.

* * * * *